(12) United States Patent
Sullivan et al.

(10) Patent No.: US 9,095,748 B2
(45) Date of Patent: Aug. 4, 2015

(54) MULTI-LAYERED CORES FOR GOLF BALLS CONTAINING POLYAMIDE AND IONOMER LAYERS

(75) Inventors: Michael J. Sullivan, Barrington, RI (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 715 days.

(21) Appl. No.: 13/173,325

(22) Filed: Jun. 30, 2011

(65) Prior Publication Data

US 2012/0309563 A1    Dec. 6, 2012

Related U.S. Application Data

(63) Continuation-in-part of application No. 13/152,598, filed on Jun. 3, 2011.

(51) Int. Cl.
*A63B 37/04* (2006.01)
*A63B 37/00* (2006.01)
(Continued)

(52) U.S. Cl.
CPC ......... *A63B 37/0075* (2013.01); *A63B 37/0003* (2013.01); *A63B 37/0032* (2013.01); *A63B 37/0033* (2013.01); *A63B 37/0039* (2013.01); *A63B 37/0043* (2013.01); *A63B 37/0045* (2013.01); *A63B 37/0049* (2013.01); *A63B 37/0059* (2013.01); *A63B 37/0062* (2013.01); *A63B 37/0063* (2013.01); *A63B 37/0064* (2013.01); *A63B 37/0065* (2013.01); *A63B 37/0069* (2013.01); *A63B 37/0076* (2013.01); *A63B 37/0092* (2013.01); *C08L 23/0876* (2013.01); *C08L 77/00* (2013.01)

(58) Field of Classification Search
CPC . C08L 77/00; C08L 23/0876; A63B 37/0092; A63B 37/0069; A63B 37/0059; A63B 37/0062; A63B 37/0063; A63B 37/0065; A63B 37/0039; A63B 37/0041
USPC .......................................... 473/371–374, 376
See application file for complete search history.

(56) References Cited

U.S. PATENT DOCUMENTS 5,886,103 A   3/1999  Bellinger et al.
6,241,625 B1  6/2001  Yakota et al.
(Continued)

FOREIGN PATENT DOCUMENTS

WO    WO 2010/002684 A1    1/2010

OTHER PUBLICATIONS

EMS—Grivory, Technical Data Sheet Grivory GTR 45, Apr. 2001.
(Continued)

*Primary Examiner* — John E Simms, Jr.
(74) *Attorney, Agent, or Firm* — Daniel W. Sullivan (57) ABSTRACT

Multi-piece golf balls having a solid core of at least one layer and cover of at least one layer are provided. At least one of the core layers comprises a thermoplastic ionomer composition, preferably a highly neutralized ethylene acid copolymer. And, at least one of the core layers comprises a thermoplastic polyamide composition. The ionomer composition is preferably used to form the inner core and the polyamide composition is preferably used to form the outer core layer. More preferably, the ionomer composition has a flex modulus of 80,000 psi or less and the polyamide composition has a flex modulus of 90,000 psi or greater. The resulting ball has high resiliency and rebounding properties.

12 Claims, 1 Drawing Sheet

(51) Int. Cl.
*C08L 23/08* (2006.01)
*C08L 77/00* (2006.01)

(56) References Cited

U.S. PATENT DOCUMENTS

| | | | |
|---|---|---|---|
| 6,245,859 B1 * | 6/2001 | Sullivan et al. | 525/330.2 |
| 6,271,296 B1 * | 8/2001 | Nakamura et al. | 524/423 |
| 6,461,251 B1 * | 10/2002 | Yamagishi et al. | 473/376 |
| 6,756,436 B2 | 6/2004 | Rajagopalan et al. | |
| 6,774,184 B2 | 8/2004 | Rajagopalan | |
| 6,800,690 B2 | 10/2004 | Rajagopalan et al. | |
| 6,815,480 B2 | 11/2004 | Statz et al. | |
| 6,824,477 B2 | 11/2004 | Rajagopalan et al. | |
| 7,144,938 B1 | 12/2006 | Feinberg et al. | |
| 7,147,578 B2 | 12/2006 | Nesbitt et al. | |
| 7,211,008 B2 | 5/2007 | Sullivan et al. | |
| 7,357,736 B2 | 4/2008 | Sullivan et al. | |
| 7,375,151 B2 | 5/2008 | Statz et al. | |
| 2003/0073514 A1 * | 4/2003 | Iwami et al. | 473/371 |
| 2004/0033847 A1 * | 2/2004 | Higuchi et al. | 473/371 |
| 2005/0049367 A1 * | 3/2005 | Rajagopalan et al. | 525/366 |
| 2007/0203277 A1 | 8/2007 | Chen | |
| 2008/0227568 A1 * | 9/2008 | Sullivan et al. | 473/376 |
| 2009/0017940 A1 | 1/2009 | Sullivan et al. | |
| 2009/0023516 A1 * | 1/2009 | Rajagopalan et al. | 473/373 |
| 2009/0118040 A1 * | 5/2009 | De Garavilla | 473/373 |
| 2009/0124419 A1 * | 5/2009 | Sullivan et al. | 473/374 |
| 2009/0227394 A1 | 9/2009 | Bulpett et al. | |
| 2009/0325733 A1 * | 12/2009 | Morken et al. | 473/378 |
| 2010/0167845 A1 | 7/2010 | Kim et al. | |
| 2010/0304893 A1 | 12/2010 | De Garavilla | |
| 2011/0152450 A1 | 6/2011 | Kobayashi et al. | |

OTHER PUBLICATIONS

EMS—Grivory, Technical Data Sheet Grilamid TR 90, Apr. 2001.
Dupont, Technical Data Sheet—Golf Ball Resins HPF 1000, May 2005.
Dupont, Technical Data Sheet—Golf Ball Resins HPF 2000, May 2005.

* cited by examiner

MULTI-LAYERED CORES FOR GOLF BALLS CONTAINING POLYAMIDE AND IONOMER LAYERS

CROSS-REFERENCE TO RELATED APPLICATIONS

This application is a continuation-in-part of co-pending, co-assigned U.S. patent application Ser. No. 13/152,598 having a filing date of Jun. 3, 2011, the entire disclosure of which is hereby incorporated by reference.

BACKGROUND OF THE INVENTION

1. Field of the Invention

The present invention generally relates to multi-piece golf balls having a solid core of at least one layer and cover of at least one layer. At least one of the core layers comprises a thermoplastic ionomer composition and at least one of the core layers comprises a thermoplastic polyamide composition. Preferably, the ball contains a dual-core having an inner core and surrounding outer core layer or a multi-layered core having an inner core, intermediate core layer, and outer core layer.

2. Brief Review of the Related Art

Multi-piece, solid golf balls are used today by recreational and professional golfers. Basically, these golf balls contain an inner core protected by a durable cover. The core and cover may be single or multi-layered. For example, three-piece golf balls having an inner core, inner cover layer, and outer cover layer may be used. In other instances, golfers will use a four-piece ball containing a dual-core (inner core and surrounding outer-core layer) and dual-cover (inner cover layer and surrounding outer cover layer). Intermediate (casing) layer(s) may be disposed between the core and cover layers to impart various properties and thus form five-piece balls and the like. Normally, the core layers are made of a natural or synthetic rubber material such as, for example, styrene butadiene, polybutadiene, poly(cis-isoprene), or poly(trans-isoprene); and the cover layers are made of a durable material such as, for example, ethylene acid copolymer ionomer resins, polyamides, polyesters, polyurethanes, or polyureas. Today, the industry is interested, among other things, in making balls that can rebound faster, retain more total energy when struck with a club, and have longer flight distance.

In general, the rebounding performance of a golf ball is based on its initial velocity after being struck by the face of a golf club and its outgoing velocity after making impact with a hard surface. More particularly, the "coefficient of restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under these conditions. Balls with a higher rebound velocity have a higher COR value. To improve the resiliency and rebounding performance of the golf ball, the industry has focused primarily on the material and construction of the ball's core.

Golf balls having single-layered and multi-layered cores have been developed. For example, Bulpett et al, US Patent Application Publication US 2009/0227394 discloses multi-layered core construction comprising: a) an inner core formed from a first thermoset rubber composition; b) an intermediate core layer formed from a partially-neutralized or highly-neutralized ionomer composition; and c) an outer core formed from a second thermoset rubber composition. A cover layer having a thickness of about 0.01 to 0.05 inches and a surface hardness of about 60 Shore D or less is formed around the core.

Sullivan et al., US Patent Application Publication No. US 2009/0017940 discloses golf balls having a dual-core and a single-layered cover. The dual-core includes an inner core formed from a rubber composition and an outer core layer formed from a highly neutralized polymer (HNP) composition comprising an ethylene acid copolymer. In the HNP composition, at least 80% of all acid groups are neutralized. The inner core has an outer surface hardness of less than 80 Shore C; the outer core layer has an outer surface hardness of 56 Shore D or greater; and the cover layer has a material hardness of 60 Shore D or less.

Sullivan et al., U.S. Pat. Nos. 7,357,736 and 7,211,008 disclose golf balls comprising: a) an inner core layer formed from a diene rubber composition; (b) an outer core layer formed from a high modulus highly neutralized polymer (HNP) comprising a highly neutralized ethylene/(meth) acrylic acid copolymer having a modulus of from 45,000 psi to 150,000 psi; (c) an intermediate core layer disposed between the inner core layer and the outer core layer and formed from a low modulus HNP composition comprising a highly neutralized ethylene/(meth)acrylic acid/alkyl (meth) acrylate copolymer having a modulus of from 1,000 psi to 50,000 psi. In the HNP compositions, at least 80% of all acid groups are neutralized.

Nesbitt et al., U.S. Pat. No. 7,147,578 discloses golf balls containing a dual-core. The inner core (center) and outer core layer may be formed from a thermoset material or a thermoplastic material. The '578 patent discloses suitable thermoset materials as including polybutadiene or any natural or synthetic elastomer, metallocene polyolefins, polyurethanes, silicones, polyamides, and polyureas. Suitable thermoplastic materials are described as including ionomers, polyurethane elastomers, and combinations thereof. In particular, the '578 patent discloses the following commercially available thermoplastic resins are preferred for use in the dual-cores: Capron® 8351 (Allied Signal Plastics), Lexan® ML5776 (General Electric), Pebax® 3533 (Elf Atochem), and Hytrel® G4074 (DuPont).

As noted above, ethylene acid copolymer ionomers have been used to form components in golf balls. In general, polyamide compositions also have been used in golf ball constructions. For example, Kim et al, US Patent Application Publication US 2010/0167845 discloses golf balls having components including intermediate layers and outer cover layers prepared from blends of polyamides mixed with one or more functional polymer modifiers. The functional polymer modifier incorporates a copolymer or a terpolymer having a glycidyl group, hydroxyl group, maleic anhydride group or carboxylic group. According to the '845 Publication, when these materials are used in golf ball covers or intermediate layers, the balls exhibit improved impact durability.

Rajagopalan et al., U.S. Pat. No. 6,800,690 discloses a golf ball comprising a core and a cover, wherein at least a portion of the cover is formed from a composition comprising a polyamide copolymer formed from reactants consisting essentially of at least one dibasic acid and at least one diamine, wherein the at least one dibasic acid comprises about 14 carbons to about 40 carbons, and wherein the polyamide copolymer lacks affinity for water.

Bellinger and Sullivan, U.S. Pat. No. 5,886,103 discloses a golf ball having a cover layer made from a resin comprising a polyamide component, an ionomeric component, and an ester component comprising a copolymer of ethylene and ethylacrylate, wherein the content of the polyamide component is at least 23 wt % of the resin composition. The golf ball has a coefficient of restitution of at least 0.750.

Although some conventional multi-layered core constructions are generally effective in providing high resiliency golf balls, there is a continuing need for improved core constructions in golf balls. Particularly, it would be desirable to have multi-layered core constructions that could be manufactured efficiently, have relatively low material costs, and provide the ball with high quality and performance properties. In particular, the core should provide the ball with good flight distance along with a comfortable and soft feel. The present invention provides core constructions and resulting golf balls having such properties as well as other advantageous features, and benefits.

SUMMARY OF THE INVENTION

The present invention provides a multi-piece golf ball comprising a solid core having at least one layer and a cover having at least one layer. The golf ball may have different constructions. For instance, in one version, a golf ball having a dual-core is made; while in another version, a golf ball having a three-layered core is made. Two different compositions are used to form the dual-core. In a preferred embodiment, a thermoplastic polyamide composition is used to form the outer core; and an ionomer composition comprising an ethylene acid copolymer and containing acid groups such that greater than 70% of the acid groups are neutralized, preferably 90% or greater, is used to form the inner core layer.

Different materials can be used as the neutralizing agent in the ionomer composition. For example, the neutralizing agent can be a metal cation salt, wherein the metal cation is selected preferably from Zn, Na, Li, K, Ca, Mg, Ni, Mn, Cu, Ti, and Al, and mixtures thereof. In one preferred version, the ionomer composition contains a fatty acid or salt thereof, such as, for example, behenic acid, erucic acid, oleic acid, linoelic acid, and dimerized derivatives and mixtures thereof, preferably oleic acid and/or erucic acid.

In one version, the polyamide composition is relatively rigid having a flex modulus of 90,000 psi or greater and the ionomer composition is relatively flexible having a flex modulus of 80,000 psi or less, and preferably the modulus of the polyamide composition is at least 15% greater than the modulus of the ionomer composition. In particular versions, the flex modulus of the polyamide composition is 100,000 psi or less, more particularly 120,000 psi or greater; and the flex modulus of the ionomer composition is 70,000 psi or less, more particularly 50,000 psi or less. The center of the inner core and surface of the outer core each has a hardness and the surface hardness of the outer core layer (for example, 40 Shore D or greater) preferably is greater than the center hardness of the inner core (for example, 30 Shore D or greater).

The cover may be single or multi-layered. For example, a single-layered cover having a thickness of about 0.015 to about 0.090 inches may be made from a thermoplastic or thermoset polymer material. In another instance, a dual-cover having inner and outer cover layers and an overall thickness of about 0.020 to about 0.210 inches may be made. In one preferred version, the outer cover has a Shore D hardness of less than 65 and the hardness of the outer cover is less than the hardness of the inner cover layer. The inner core preferably has a diameter in the range of about 0.125 to 1.50 inches and the outer core preferably has a thickness in the range of about 0.010 to about 0.570 inches, more preferably about 0.020 to about 0.280 inches. The dual-core normally has an overall compression in the range of about 50 to about 130, preferably about 70 to about 110.

In another embodiment, the highly neutralized ionomer composition (containing acid groups neutralized to greater than 70%) is used to form the outer core, while the thermoplastic polyamide composition is used to form the inner core. The ionomer composition is relatively flexible having a flex modulus of 80,000 psi or less, and the polyamide composition is relatively rigid having a flex modulus of 90,000 psi or greater.

BRIEF DESCRIPTION OF THE DRAWINGS

The novel features that are characteristic of the present invention are set forth in the appended claims However, the preferred embodiments of the invention, together with further objects and attendant advantages, are best understood by reference to the following detailed description in connection with the accompanying drawings in which:

DETAILED DESCRIPTION OF THE INVENTION

The present invention relates generally to golf balls containing at least one component made from a thermoplastic polyamide composition and at least one component made from a thermoplastic ionomer composition. In a particularly preferred version, an ionomer composition comprising an ethylene acid copolymer, wherein the composition contains acid groups such that greater than 70%, preferably 90% or greater, of the acid groups are neutralized is used to form an inner core; and a polyamide composition is used to form an outer core layer.

Golf balls having various constructions may be made in accordance with this invention. For example, golf balls having three-piece, four-piece, and five-piece constructions with single or multi-layered covers may be made The term, "layer" as used herein means generally any spherical portion of the golf ball. More particularly, in one version, a three-piece golf ball having a dual-core and a cover is made. The dual-core includes an inner core (center) and surrounding outer core layer. In another version, a four-piece golf ball comprising a dual-core and dual-cover comprising an inner cover and outer cover is made. In yet another construction, a four-piece or five-piece golf ball having a multi-layered core comprising an inner core (center), intermediate core layer, and outer core layer, may be made. The golf balls of this invention may further contain an intermediate layer(s). As used herein, the term, "intermediate layer" means a layer of the ball disposed between the core and cover. The intermediate layer also may be referred to as a casing or mantle layer. The diameter and thickness of the different layers along with properties such as hardness and compression may vary depending upon the construction and desired playing performance properties of the golf ball.

Thermoplastic Polyamides

As discussed above, thermoplastic polyamides may be used to form the compositions of this invention. In general, polyamides refer to high molecular weight polymers in which amide linkages (—CONH—) occur along the length of the molecular chain (*Hawley's Condensed Chemical Dictionary*, 13th Ed.).) Suitable polyamides for use in the compositions of this invention may be obtained, for example, by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as c-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include, but are not limited to, nylon 6, nylon 66, nylon 610, nylon 11, and nylon 12.

Different commercially-available nylon resins may be used in accordance with the present invention including, but not limited to, Trimid® and Polyram® nylon 66 and nylon 6 resins, available from Polymer Technology & Services, LLC; Technyl® nylon 66 and nylon 6 resins, available from Rhodia Engineering Plastics; Ultramid® and Capron® nylon 6 resins, available from BASF; Cristamid® and Rilsan® nylon resins, available from Arkema Inc; Vestamid® nylon resins, available from Evonik Industries; Zytel® and Elvamide® nylon resins, available from the DuPont Company; and Grivory® GTR 45 and Grilamid® TR-90, transparent nylon resins, available from Grilamid® EMS.

Different grades of polyamides and their respective properties, which may be used in accordance with this invention, are described in the following Tables I, II, and III.

TABLE I

Polyamide Resins

| Property | Test Method | Units | TRIMID N-66 100L | TECHNYL A205F | POLYRAM PA100 |
|---|---|---|---|---|---|
| Flexural Modulus | D790 | kpsi | 410 | 421 | 392 |
| Tensile Strength, Ultimate | ISO 527 | psi |  | 8,700 |  |
| Tensile Strength, Yield | D 638 | psi | 12,000 | 12,300 | 12,300 |
| Elongation at Break | D638 | % | 50% | 25% | 4% |
| Elongation at Yield | ISO 527 | % |  | 4% |  |
| Izod impact | D256 | ft lb/in | 0.933 | 2.14 | 1.03 |
| Melting point | D3418 | ° F. | 491 | 505 | 493 |

TRIMID N-66 100L is a nylon 66 resin, available from Polymer Technology & Services, LLC.
TECHNYL A205F is a nylon 66 resin, available from Rhodia Engineering Plastics.
POLYRAM PA100 is a nylon 66 resin, available from Polymer Technology & Services, LLC.

TABLE II

Polyamide Resins

| Property | Test Method | units | ELVAMIDE 8061 | ELVAMIDE 8063 | ELVAMIDE 8066 |
|---|---|---|---|---|---|
| Flexural Modulus | D790 | kpsi | 138 | 131 |  |
| Tensile Strength | D 638 | psi | 7,500 | 7,500 | 5,700 |
| Elongation at break | D638 | % | 320 | 315 | 370 |
| Izod impact | D256 |  |  |  |  |
| Melting point | D3418 | ° F. | 313 | 316 | 239 |

ELVAMIDE 8061, 8063, and 8066 are nylon multi-polymer resins, available from the DuPont Company.

TABLE III

Polyamide Resins

| Property | Test Method | Units | ZYTEL NC010 | ZYTEL BK431 |
|---|---|---|---|---|
| Flexural Modulus | D790 | kpsi | 247 | 300 |
| Tensile Modulus | ISO 527 | psi | 305,000 | 312,000 |
| Nominal Strain at Break | D638 | % | 10 | 14 |
| Izod impact | D256 |  |  |  |
| Melting point | D3418 | ° F. | 581 | 610-625 |

ZYTEL NC010 and BK431 are nylon multi-polymer resins, available from the DuPont Company.

More particularly, the polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (nylon 6, nylon 6,6, nylon 11, nylon 12 and the like) as a hard segment and a polyether or polyester as a soft segment. In one specific example, the thermoplastic polyamides are amorphous copolyamides based on polyamide 12. Polyamide homopolymers are produced by two common methods. In the first, a compound containing one organic acid-type end group and one amine end group is formed into a cyclic monomer. The polyamide is then formed from the monomer by a ring-opening polymerization. These polyamides are commonly designated as nylon 6, nylon 11, nylon 12, and the like, where the number indicates the number of carbon atoms making up the ring in the monomer. The second method involves the condensation polymerization of a dibasic acid and a diamine. These polyamides are commonly designated as nylon 4,6, nylon 6,6, nylon 6,9, nylon 6,10, nylon 6,12, and the like, where the first number indicates the number of carbon atoms connecting the two amine groups in the diamine and the second number indicates the number of carbon atoms connecting the two acid groups in the dibasic acid, including those in the acid groups. For example, nylon 6 is a homopolymer of caprolactam, that is, polycaprolactam. Nylon 6,6 is the reaction product of hexamethylenediamine and adipic acid.

Preferred polyamide homopolymers include nylon 4, nylon 6, nylon 7, nylon 11, nylon 12, nylon 13, nylon 4,6, nylon 6,6, nylon 6,9, nylon 6,10, nylon 6,12, nylon 12,12, nylon 13,13 and mixtures thereof. More preferred polyamide homopolymers include nylon 6, nylon 11, nylon 12, nylon 4,6, nylon 6,6, nylon 6,9, nylon 6,10, nylon 6,12 and mixtures thereof. The most preferred polyamide homopolymers are nylon 11 and nylon 12.

Compositions of nylon 11 and 12 and copolymers and blends thereof are particularly effective in the present invention. More specifically, polyamide compositions having mechanical properties that do not significantly change after the composition has been exposed to moisture are particularly effective. These polyamide compositions can be used to form the outer core layer and protect the inner core from moisture. The outer core layer encapsulates the inner core so that fluids do not penetrate therein. Moreover, these polyamide compositions maintain their physical properties under humid conditions. As a result, the playing performance properties of such golf balls (for example, COR and compression) are not harmfully affected when the balls are stored in humid conditions. For example, the outer core layer may be made from a polyamide composition, particularly compositions of nylon 11 and 12 and copolymers and blends thereof, so the polyamide composition has a flex modulus value under relatively dry (at 23° C.) and relatively humid conditions (50% relative humidity (RH) at 23° C.). Significantly, the difference between the flex modulus of the composition under dry conditions versus humid conditions is no greater than 20 percent, preferably no greater than 15 percent, and more preferably no greater than 10 percent. That is, the flex modulus properties of these polyamide compositions do not substantially change after the composition absorbs moisture. Because the polyamide compositions are relatively stable, they are particularly effective for making outer core layers in accordance with this invention.

Compositions of polyether-amide block copolymers, which are commonly known as Pebax® resins and are available from Arkema, Inc. (Columbs, France), also are particularly effective in the present invention.

In general, polyether amide block copolymers may be prepared by polycondensation of a polyamide with carboxyl end-groups with a polyether glycol. These block copolymers have been prepared using polyethylene glycol, polypropylene glycol, polytetramethylene glycol, copolyethers derived therefrom, and copolymers of THF and 3-alkylTHF as shown by U.S. Pat. Nos. 4,230,838, 4,252,920, 4,349,661, 4,331,786 and 6,300,463, the disclosures of which are hereby incorporated by reference. The general structure of the polyether amide block copolymer may be represented by the following formula (I):

represents a polyamide segment containing terminal carboxyl groups or acid equivalents thereof (for example, diacid anhydrides, diacid chlorides or diesters) and
—O-G-O—
is a polyether segment.

Different grades of Pebax® polyether amide block copolymers and their respective properties, which may be used in accordance with this invention, are described in the following Tables IV and V.

TABLE IV

Pebax ® Polyether-amide block copolymers

| Property | Test Method | Units | PEBAX Grade 7233 | 7033 | 6333 | 5533 |
|---|---|---|---|---|---|---|
| Hardness, durometer D | D 2240 | D | 72 | 69 | 63 | 55 |
| Flexural Modulus | D790 | psi | 107,000 | 67,000 | 49,000 | 29,000 |
| Tensile Strength, Ultimate | D 638 | psi | 9210 | 8300 | 8100 | 7300 |
| Elongation, Ultimate | D638 | % | 360 | 400 | 300 | 430 |
| Izod impact at 20 F. | D256 | ft lb/in | 1.4 | no break | no break | no break |
| At −40 F. | | | 1.4 | 0.95 | 1.5 | no break |
| Melting point | D3418 | ° F. | 348 | 345 | 342 | 334 |
| Vicat softening point | D1525 | ° F. | 327 | 329 | 322 | 291 |
| Specific Gravity | D792 | | 1.02 | 1.02 | 1.01 | 1.01 |

TABLE V

Pebax ® Polyether-amide block copolymers

| Property | Test Method | Units | PEBAX 4033 | PEBAX 3533 | PEBAX 2533 |
|---|---|---|---|---|---|
| Hardness, durometer D | D2240 | D | 40 | 35 | 25 |
| Flexural Modulus | D790 | psi | 13,000 | 2,800 | 2,100 |
| Tensile Strength, Ultimate | D638 | psi | 5700 | 5600 | 4950 |
| Elongation, Ultimate | D638 | % | 390 | 580 | 640 |
| Izod impact at 20 F. | D256 | ft lb/in | no break | no break | no break |
| at −40 F. | | | no break | no break | no break |
| Melting point | D3418 | ° F. | 334 | 306 | 298 |
| Vicat softening point | D1525 | ° F. | 270 | 165 | 140 |
| Specific Gravity | D792 | | 1.01 | 1.01 | 1.01 |

Additionally, compositions of polyamides having high acid ends and improved hydrolysis resistance, as disclosed in Kobayashi et al., US Patent Application Publication US 2011/0152450, the disclosure of which is hereby incorporated by reference, are particularly suitable for use in the present invention.

As discussed above, in one preferred version, the thermoplastic polyamide composition is used to form an outer core and the highly neutralized ionomer composition is used to form an inner core.

The polyamide composition is relatively stiff having a relatively high flex modulus of 90,000 psi or greater; while the ionomer composition is relatively flexible having a relatively low flex modulus of 80,000 psi or less. That is, in this version, the modulus of the polyamide composition is greater than the modulus of the ionomer composition. More particularly, the high modulus materials preferably have a modulus within the range having a lower limit of 90,000 or 100,000 or 110,000 or 120,000 or 130,000 or 140,000 or 150,000 psi and an upper limit of 200,000 or 300,000 or 400,000 or 500,000 or greater and a hardness of 40 Shore D or greater, or 50 Shore D or greater, or 60 Shore D or greater, or within a range having a lower limit of 40 or 50 or 60 Shore D and an upper limit of 80 or 90 or 100 Shore D. On the other hand, the low modulus materials may have a modulus with a lower limit of 1,000 or 5,000 or 10,000 or 15,000 or 20,000 or 25,000 or 30,000 psi and an upper limit of 40,000 or 45,000 or 50,000 or 60,000 or 70,000 or 80,000. The hardness of the low modulus material is generally 30 Shore D or greater; or 40 Shore D or greater; or 50 Shore D or greater, or preferably within a range having a lower limit of 30 or 40 or 50 Shore D and an upper limit of 60 or 70 or 80 or 85 Shore D. In a preferred embodiment, the modulus of the relatively high modulus material is at least 15% greater, or at least 20% greater, or at least 30% greater than the modulus of the relatively low modulus material.

By the term, "modulus" as used herein, it is meant flexural modulus which is the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. The formula used to calculate the flexural modulus from the recorded load (F) and deflection (D) is:

$$E_B = \frac{3}{4} \frac{FL^3}{bd^3 D}$$

wherein,
L=span of specimen between supports (m);
b=width (m); and
d=thickness (m)

If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. Flexural modulus can be determined in accordance with ASTM D790 standard among other testing procedures.

Ethylene Acid Copolymers

Suitable ethylene acid copolymers that may be used to form the compositions of this invention are generally referred to as copolymers of ethylene; $C_3$ to $C_8$ α, β-ethylenically unsaturated mono- or dicarboxylic acid; and optional softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth)acrylate" means methacrylate and/or acrylate.

When a softening monomer is included, such copolymers are referred to herein as E/X/Y-type copolymers, wherein E is ethylene; X is a $C_3$ to $C_8$ α, β-ethylenically unsaturated mono- or dicarboxylic acid; and Y is a softening monomer. The softening monomer is typically an alkyl (meth)acrylate, wherein the alkyl groups have from 1 to 8 carbon atoms. Preferred E/X/Y-type copolymers are those wherein X is (meth) acrylic acid and/or Y is selected from (meth)acrylate, n-butyl (meth)acrylate, isobutyl (meth)acrylate, methyl (meth)acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The acidic groups in the copolymeric ionomers are partially or totally neutralized with a cation source. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. Preferred metal cation salts are calcium and magnesium-based salts. High surface area cation particles such as micro and nano-scale cation particles are preferred. The amount of cation used in the composition is readily determined based on desired level of neutralization.

In the present invention, the ionomer resins have acid groups that are neutralized greater than about 70 percent, preferably at least 80%, more preferably at least 90% and even more preferably at least 100%. In another embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In one preferred embodiment, a high acid ethylene acid copolymer containing about 19 to 20 wt. % methacrylic or acrylic acid is neutralized with magnesium cations to a 100% or greater neutralization level.

As discussed above, ethylene acid copolymer ionomer resins, which are highly neutralized, may be used in accordance with this invention and suitable examples of these highly neutralized polymers (HNPs) are described in the following Table VI (dipolymers) and Tables VII and VIII (terpolymers).

TABLE VI

Ethylene Acid Dipolymers Neutralized to Different Levels

| | | Base Resin Props. | | HNP Properties | | | | | | |
|---|---|---|---|---|---|---|---|---|---|---|
| | | % Acid/ | % Fatty/ | % | Atti | Sphere | Shore D | | Flex | Melt |
| Ex # | Resin | Type | Type* | Neut. | Comp. | CoR | Sphere | Plaque | Mod. | Index |
| 1 | R-17 | 21% AA | 36.8% Ol | 125% | 129 | 0.884 | 58.7 | — | — | 0.03 |
| 2 | R-14 | 20% MAA | 35.9% Ol | 139% | 130 | 0.864 | 56.0 | 60 | 24.5 | 0.63 |
| 3 | R-14 | 20% MAA | 36.7% Ol | 162% | 128 | 0.862 | 50.6 | 57 | 20.9 | 0.45 |
| 4 | R-14 | 20% MAA | 38.3% Ol | 170% | 120 | 0.866 | 52.0 | 57 | 21.5 | 0.59 |
| 5 | R-14 | 20% MAA | 39.9% Ol | 178% | 119 | 0.867 | 48.5 | 55 | 20.4 | 0.72 |
| 6 | R-15 | 19% MAA | 41% Ol | 134% | 115 | 0.868 | 48.0 | 54 | 16.8 | 1.2 |
| 7 | R-15 | 19% MAA | 41% Ol | 134% | 116 | 0.866 | 51.3 | 57 | 20 | 0.6 |
| 8 | R-15 | 19% MAA | 36.9% Ol | 146% | 119 | 0.863 | 49.6 | 57 | 21.5 | 0.5 |
| 9 | R-15 | 19% MAA | 39% Ol | 160% | 128 | 0.865 | 51.0 | 57 | 20.9 | 0.61 |
| 10 | R-15 | 19% MAA | 46% Ol | 160% | 115 | 0.862 | 49.2 | 54 | 18.3 | 0.62 |
| 11 | R-15 | 19% MAA | 41.4% Ol | 174% | 116 | 0.867 | 47.1 | 56 | 20.1 | 0.75 |
| 12 | R-16 | 19% MAA | 35% Ol | 126% | 96 | 0.860 | 53.0 | 57 | 20.8 | 1.2 |
| 13 | R-16 | 19% MAA | 39.9% Ol | 174% | 109 | 0.862 | 47.4 | 56 | 17.2 | 0.96 |
| 14 | R-18 | 18% AA | 36% Ol | 81% | 122 | 0.819 | — | 57 | 20.6 | 0.8 |
| 15 | R-18 | 18% AA | 40% Ol | 97% | 125 | 0.818 | — | — | — | 0.75 |
| 16 | R-18 | 18% AA | 34.8% Ol | 150% | 108 | 0.867 | 55.9 | — | — | 0.22 |
| 17 | R-18 | 18% AA | 40.4% Er | 153% | 97 | 0.872 | 50.1 | — | — | 0.46 |
| 18 | R-19 | 15.4% AA | 40% Ol | 98% | 115 | 0.821 | — | — | — | 0.38 |

R-14: An ethylene methacrylic acid (MAA) dipolymer with 20 weight % of MAA, and a Melt Index of 500.
R-15: An ethylene methacrylic acid (MAA) dipolymer with 19 weight % of MAA, and a Melt Index of 305.
R-16: An ethylene methacrylic acid (MAA) dipolymer with 19 weight % of MAA, and a Melt Index of 250.
R-17: An ethylene acrylic acid (AA) dipolymer with 21 weight % of AA, and a Melt Index of 300.
R-18: An ethylene acrylic acid (AA) dipolymer with 18 weight % of AA, and a Melt Index of 60.
R-19: An ethylene acrylic acid (AA) dipolymer with 15.4 weight % of AA, and a Melt Index of 80.
*Fatty Acid Type: Ol—Oleic acid and Er—Erucic Acid As shown in above Table VI, the flex modulus of some highly neutralized ethylene acid copolymers may fall within the range of about 10,000 to about 40,000 psi, preferably 15,000 to 35,000 psi, in some instances. Such ionomer compositions may be used to form a relatively low modulus core layer in accordance with this invention.

TABLE VII

Ethylene Acid Terpolymers Neutralized to Different Levels

| | | Base Resin Properties | | HNP Properties | | | | | |
|---|---|---|---|---|---|---|---|---|---|
| | | % Acid/ | % Fatty/ | % | Atti | Sphere | Shore D | | HNP |
| Ex # | Resin | Type/% Ester | Type | Neut. | Comp | CoR | Sphere | Plaque | MI |
| 19 | R-11 | 21.3% AA/2% nBA | 40.5% 50/50 O/E | 103% | 124 | 0.886 | 55.3 | — | 0.29 |
| 20 | R-11 | 21.3% AA/2% nBA | 44% 50/50 O/E | 123% | 118 | 0.889 | 51.5 | — | 0.34 |
| 21 | R-11 | 21.3% AA/2% nBA | 30.7% oleic | 105% | 141 | 0.884 | 58.1 | — | 0.01 |
| 22 | R-11 | 21.3% AA/2% nBA | 42.6% oleic | 105% | 131 | 0.889 | 54.5 | — | 0.37 |
| 23 | R-12 | 21.4% AA/4% nBA | 31.6% oleic | 99% | 140 | 0.866 | 59.1 | — | 0.17 |
| 24 | R-12 | 21.4% AA/4% nBA | 41.9% oleic | 105% | 127 | 0.888 | 53.3 | — | 0.48 |
| 25 | R-12 | 21.4% AA/4% nBA | 34.3% oleic | 134% | 131 | 0.872 | 57 | — | 0.06 |
| 26 | R-12 | 21.4% AA/4% nBA | 39.3% 50/50 O/E | 102% | 123 | 0.884 | 55.1 | — | 0.25 |
| 27 | R-2 | 20.8% AA/2% nBA | 36.7 oleic | 124% | 127 | 0.880 | 59.6 | — | 0.06 |
| 28 | R-7 | 19.5% MAA/4% nBA | 29.5% oleic | 150% | 122 | 0.835 | 53.6 | — | 0.31 |
| 29 | R-7 | 19.5% MAA/4% nBA | 32.1% oleic | 142% | 115 | 0.835 | 52.6 | — | 0.89 |
| 30 | R-7 | 19.5% MAA/4% nBA | 38.7% oleic | 143% | 111 | 0.853 | 49.7 | — | 2.58 |
| 31 | R-7 | 19.5% MAA/4% nBA | 38% oleic | 195% | 112 | 0.853 | 48.2 | — | 0.93 |
| 32 | R-9 | 17.6% AA/4% nBA | 30.5% oleic | 122% | 123 | 0.865 | 54.2 | — | 0.16 |

TABLE VII-continued

Ethylene Acid Terpolymers Neutralized to Different Levels

| | | Base Resin Properties | | HNP Properties | | | Shore D | | HNP |
|---|---|---|---|---|---|---|---|---|---|
| Ex # | Resin | % Acid/ Type/% Ester | % Fatty/ Type | % Neut. | Atti Comp | Sphere CoR | Sphere | Plaque | MI |
| 33 | R-9 | 17.6% AA/4% nBA | 32.1% oleic | 104% | 125 | 0.866 | 52.7 | — | 0.46 |
| 34 | R-9 | 17.6% AA/4% nBA | 40% oleic | 104% | 116 | 0.882 | 49.5 | — | 1.12 |
| 35 | R-9 | 17.6% AA/4% nBA | 31% oleic | 154% | 121 | 0.862 | 58.1 | — | 0.01 |
| 36 | R-9 | 17.6% AA/4% nBA | 39.6% oleic | 135% | 120 | 0.880 | 50.7 | — | 0.35 |
| 37 | R-8 | 17.5% MAA/8% nBA | 30.8% oleic | 138% | 107 | 0.828 | 47.3 | — | 2.21 |
| 38 | R-8 | 17.5% MAA/8% nBA | 29.4% oleic | 152% | 112 | 0.842 | 51.1 | — | 0.01 |
| 39 | R-8 | 17.5% MAA/8% nBA | 36.8% oleic | 160% | 102 | 0.844 | 46.8 | — | 6.85 |
| 40 | R-8 | 17.5% MAA/8% nBA | 38.2% oleic | 215% | 104 | 0.847 | 47 | — | 4.55 |
| 41 | R-6 | 15.7% MAA/7.8% nBA | 40% oleic | 153% | 97 | 0.868 | 47.8 | — | 0.95 |
| 42 | R-6 | 15.7% MAA/7.8% nBA | 37.5% oleic | 129% | 97 | 0.866 | 48.6 | — | 1.05 |

R-2: A 50/50 blend by weight of the following: i) an ethylene/acrylic acid (AA)/n-butyl acrylate (nBA) terpolymer with 20.5 weight % of AA and 4.0 weight % of nBA, and a Melt Index of about 750; and ii) an ethylene/AA copolymer with 21.0 weight % of AA and a Melt Index of 300.
R-6: An ethylene/methacrylic acid (MAA)/nBA terpolymer with 15.7 weight % of MAA and 7.8 weight % of nBA, and a Melt Index of 122.
R-7: An ethylene/MAA/nBA terpolymer with 19.5 weight % of MAA and 4.0 weight % of nBA, and a Melt Index of 265.
R-8: An ethylene/MAA/nBA terpolymer with 17.5 weight % of MAA and 8.0 weight % of nBA, and a Melt Index of 280.
R-9: An ethylene/AA/nBA terpolymer with 17.6 weight % of AA and 4.0 weight % of nBA, and a Melt Index of 285.
R-11: An ethylene/AA/nBA terpolymer with 21.3 weight % of AA and 2.0 weight % of nBA, and a Melt Index of 275.
R-12: An ethylene/AA/nBA terpolymer with 21.4 weight % of AA and 4.0 weight % of nBA, and a Melt Index of 275.
* Fatty Acid Type: Oleic Acid and Erucic Acid O—Oleic acid and E—Erucic Acid.

TABLE VIII

Ethylene Acid Terpolymers Neutralized to Different Levels

| | | Base Resin Properties | | HNP Properties | | | Shore D | | HNP |
|---|---|---|---|---|---|---|---|---|---|
| Ex # | Resin | % Acid/ Type/% Ester | % Fatty/ Type | % Neut. | Atti Comp | Sphere CoR | Sphere | Plaque | MI |
| 43 | R-10 | 15.4% AA/8% nBA | 30% oleic | 114% | 117 | 0.870 | 53.6 | — | 0.29 |
| 44 | R-10 | 15.4% AA/8% nBA | 39.8% oleic | 138% | 111 | 0.875 | 48.3 | — | 0.75 |
| 45 | R-10 | 15.4% AA/8% nBA | 36.5% oleic | 142% | 101 | 0.875 | 49.6 | — | 0.21 |
| 46 | R-1 | 12% AA/17.6% nBA | 36.5% oleic | 135% | 118 | 0.868 | 47.7 | — | 0.35 |
| 47 | R-3 | 10.5% AA/15.5% nBA | 35% oleic | 102% | 101 | 0.859 | 45.8 | — | 1 |
| 48 | R-3 | 10.5% AA/15.5% nBA | 34.9% oleic | 124% | 82 | 0.850 | 47.8 | — | 0.91 |
| 49 | R-3 | 10.5% AA/15.5% nBA | 37.5% oleic | 127% | 75 | 0.850 | 48.6 | — | 1.05 |
| 50 | R-13 | 9% MAA/15.5% nBA | 35.1% oleic | 120% | 62 | 0.817 | 39.2 | — | 3.68 |
| 51 | R-13 | 9% MAA/15.5% nBA | 38.7% erucic | 125% | 57 | 0.817 | 36.4 | — | 7.74 |
| 52 | R-4 | 6.2% AA/28% nBA | 35% oleic | 145% | 75 | 0.826 | 41.8 | — | 1 |
| 53 | R-4 | 6.2% AA/28% nBA | 35% oleic | 124% | 51 | 0.807 | 35.8 | — | 2.63 |
| 54 | R-4 | 6.2% AA/28% nBA | 39.8% erucic | 121% | 41 | 0.805 | 33.6 | — | 5.94 |
| 55 | R-5 | 6.2% AA/28% nBA | 35% oleic | 115% | NA | NA | NA | NA | NA |
| HPF 1000 | | 9% AA/15.5% nBA | ~40% St.A | ~100 | 110 | 0.833 | 55 | 52 | — |
| HPF 2000 | | 10.5% AA/15.5% nBA | ~40% oleic acid | ~100 | 123 | 0.863 | 47 | — | — |
| AD 1030 | NA | NA | NA | ~100 | 73 | 0.824 | — | — | — |
| AD 1035 | NA | NA | NA | ~100 | 66 | 0.826 | — | — | — |
| AD 1040 | NA | NA | NA | ~100 | 123 | 0.852 | — | — | — |

R-1: An ethylene/acrylic acid (AA)/n-butyl acrylate (nBA) terpolymer with 12 weight % of AA and 17.6 weight % of nBA, and a Melt Index of 95.
R-3: An ethylene/AA/nBA terpolymer with 10.5 weight % of AA and 15.5 weight % of nBA, and a Melt Index of 60.
R-4: An ethylene/AA/nBA terpolymer with 6.2 weight % of AA and 28.0 weight % of nBA, and a Melt Index of 60.
R-5: An ethylene/AA/nBA terpolymer with 6.2 weight % of AA and 28.0 weight % of nBA, and a Melt Index of 300.
R-10: An ethylene/AA/nBA terpolymer with 15.4 weight % of AA and 8.0 weight % of nBA, and a Melt Index of 300.
R-13: An ethylene/MAA/nBA terpolymer with 9.0 weight % of MAA and 15.5 weight % of nBA, and a Melt Index of 60.
HPF-1000, HPF-2000, AD-1030, AD-1035, and AD-1040: compositions unavailable - materials commercially available from DuPont.

The above-described ethylene acid copolymer compositions in Tables V-VII were prepared according to the following general procedure. The organic acid, ethylene acid copolymer, and neutralizing agent ($Mg(OH)_2$ concentrate) were melt-blended in a Werner & Pfleiderer twin screw extruder. The amounts of the acid and copolymer were added so that the resulting blend contained 25 to 45 weight % of the organic acid. The blend was treated with sufficient neutralizing agent so that the acid moieties of the organic acid and the acid copolymer were nominally neutralized to the level indicated in above Tables V-VII.

The highly neutralized ethylene acid copolymer compositions described in Tables VI-VIII have other physical properties, some of which are described below in Table IX. In particular, the flex modulus of some relatively highly neutralized ethylene acid copolymers may fall within the range of about 1,000 to about 20,000 psi, more particularly 3,000 to 10,000, in some instances. Such ionomer compositions may be used to form a relatively low modulus core layer in accordance with this invention.

TABLE IX

Properties of Highly Neutralized Ethylene Acid Copolymers (Flex Modulus of 5,000 PSI or Less)

| Resin | Tensile Strength (psi)* | Elongation (%)* | Shore D Hardness | Flex Modulus (psi)** |
|---|---|---|---|---|
| HPF 1000 | 2,600 | 430% | 55 | 31,000 |
| HPF 2000 | 1,800 | 330% | 47 | 12,000 |

*Tensile Strength and Elongation were measured according to ASTM D638. **Flex Modulus was measured according to ASTM D790.

Other highly neutralized ethylene acid copolymer compositions, examples of which are described below in Table X, may be used in accordance with this invention. In particular, the flex modulus of the relatively highly neutralized ethylene acid copolymers may fall within the range of about 10,000 to about 80,000 psi, preferably 20,000 to 70,000 in some instances. Such ionomer compositions may be used to form a low modulus core layer.

TABLE X

Properties of Highly Neutralized Ethylene Acid Copolymers (Flex Modulus of 10,000 PSI or Greater)

| Example | Copolymer* | Cation Source | Fatty Acid | Flex Modulus** (psi) | Shore D Hardness*** |
|---|---|---|---|---|---|
| 56 | dipolymer | Ca/Mg | Stearic | 71,600 | 57 |
| 57 | dipolymer | Ca/Li | Stearic | 70,300 | 58 |
| 58 | dipolymer | Ca | Stearic | 70,100 | 60 |
| 59 | dipolymer | Ca/Zn | Stearic | 60,400 | 58 |
| 60 | terpolymer | Mg | Stearic | 38,300 | 52 |
| 61 | dipolymer | Mg | Oleic | 27,600 | 52 |
| 62 | terpolymer | Mg | Oleic | 16,300 | 45 |
| 63 | terpolymer | Mg | Oleic | 10,600 | 40 |
| 64 | terpolymer | Mg | Oleic | 10,400 | 39 |
| 65 | dipolymer | Ca | Stearic | 60,300 | 37 |
| 66 | dipolymer | Ca | Stearic | 69,300 | 60 |
| 67 | terpolymer | Mg | Erucic | 7,300 | 37 |

*Copolymer Type: dipolymer—poly(ethylene-acrylic acid) terpolymer—Poly(ethylene-n-butyl acrylate-acrylic acid)
**Flex Modulus was measured according to ASTM D790-03, Procedure B.
***Hardness was measured according to ASTM D-2240.

Additional Materials in Ionomer Compositions

In the present invention, it is not necessary that any "ionic plasticizer" such as organic acids or salts of organic acids, particularly fatty acids, be added to the ionomer resin. Such ionic plasticizers are used to make conventional ionomer composition more processable as described in Rajagopalan et al., U.S. Pat. No. 6,756,436, the disclosure of which is hereby incorporated by reference. In the present invention such ionic plasticizers are optional. In one preferred embodiment, the thermoplastic ionomer composition, containing acid groups neutralized to greater than 70%, includes an ionic plasticizer, particularly a fatty acid or salt thereof; while, the ionomer composition that contains acid groups neutralized to 70% or less does not contain a fatty acid or salt thereof. The ionic plasticizer may be added in an amount of 0.5 to 10 pph, more preferably 1 to 5 pph. The organic acids may be aliphatic, mono- or multi-functional (saturated, unsaturated, or multi-unsaturated) organic acids. Suitable fatty acids include behenic acid, erucic acid, oleic acid, linoelic acid, and dimerized derivatives and mixtures thereof. Preferably, erucic acid and/or oleic acid is used. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

The final thermoplastic ionomer compositions of this invention may contain additional materials such as, for example, a small amount of ionic plasticizer, which is particularly effective at improving the processability of the highly-neutralized ionomer. For example, the ionic plasticizer may be added in an amount of 0.5 to 10 pph, more preferably 1 to 5 pph. In addition to the fatty acids and salts of fatty acids discussed above, other suitable ionic plasticizers include, for example, polyethylene glycols, waxes, bis-stearamides, minerals, and phthalates. In another embodiment, an amine or pyridine compound is used, preferably in addition to a metal cation. Suitable examples include, for example, ethylamine, methylamine, diethylamine, tert-butylamine, dodecylamine, and the like.

Fillers, fibers, flakes also may be included in the final ionomer composition. Particularly preferred additives of this nature include, but are not limited to, very-high-surface-area fillers that have an affinity for the acid groups in ionomer. In particular, fillers, fibers or flakes having cationic nature such that they may also contribute to the neutralization of the ionomer are suitable. Aluminum oxide comprising fillers are preferred. Also, silica, fumed silica, or precipitated silica, such as those sold under the tradename HISIL from PPG Industries, or carbon black. Nano-scale materials are also preferred and include, but are not limited to, nanotubes, nanoflakes, nanofillers, or nanoclays.

Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, titanium dioxide, acid copolymer wax, surfactants, and fillers, such as zinc oxide, tin oxide, barium sulfate, zinc sulfate, calcium oxide, calcium carbonate, zinc carbonate, barium carbonate, tungsten, tungsten carbide, silica, lead silicate, regrind (recycled material), clay, mica, talc, nano-fillers, carbon black, glass flake, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the final thermoplastic ionomer composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the ionomer composition. In a particular aspect of this embodiment, the final thermoplastic ionomer composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the final thermoplastic ionomeric composition is modified with organic fiber micropulp, as disclosed, for example, in Chen, U.S. Pat. No. 7,504,448, the entire disclosure of which is hereby incorporated herein by reference. In another version, the ionomer (or thermoplastic elastomer) compositions may contain carbon fibers or carbon fiber sheets comprising a weave of thin carbon fibers held together in a resin. In yet another version, the ionomer compositions may contain forged composite material composed of bundles of microscopic carbon fibers held together in a resin. These turbostratic carbon fibers are randomly dispersed in the resin. The structure of the forged composite material differs over traditional carbon fiber sheets. The forged composite material contains discontinuous fibers intertwined in the resin; while ordinary carbon fiber sheets are woven—they contain a weave of fibers. As a result, the forged composite material is very lightweight and has high mechanical strength.

Other suitable thermoplastic polymers that may be included in the non-Ionomer (thermoplastic elastomer) and ionomer compositions of this invention include, but are not limited to, the following polymers (including homopolymers, copolymers, and derivatives thereof.)

(a) polyesters, particularly those modified with a compatibilizing group such as sulfonate or phosphonate, including modified poly(ethylene terephthalate), modified poly(butylene terephthalate), modified polypropylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

Furthermore, the resulting thermoplastic compositions may contain natural and synthetic rubbers such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, and polystyrene elastomers.

The ionomer compositions may contain a blend of two or more ionomers. For example, the composition may contain a 50/50 wt. % blend of two different highly-neutralized ethylene/methacrylic acid copolymers. In another version, the composition may contain a blend of one or more ionomers and a maleic anhydride-grafted non-ionomeric polymer. The non-ionomeric polymer may be a metallocene-catalyzed polymer. In another version, the composition contains a blend of a highly-neutralized ethylene/methacrylic acid copolymer and a maleic anhydride-grafted metallocene-catalyzed polyethylene. In yet another version, the composition contains a material selected from the group consisting of highly-neutralized ionomers optionally blended with a maleic anhydride-grafted non-ionomeric polymer; polyester elastomers; polyamide elastomers; and combinations of two or more thereof.

In accordance with the present invention, golf balls containing dual-cores formed from thermoplastic polyamide composition and thermoplastic ionomer compositions containing acid groups neutralized to greater than 70% have several advantageous properties. For example, the compositions can be used to make a dual-core that provides the golf ball with good rebounding properties (distance) without sacrificing a nice feel to the ball. The resulting ball has a relatively high COR allowing it to reach high velocity when struck by a golf club. Thus, the ball tends to travel a greater distance which is particularly important for driver shots off the tee. At the same time, the compositions are not excessively hard and they help provide the ball with a soft and comfortable feel. The golf player experiences a better sense of control and natural feeling ball when making the shot. In general, the cores of this invention typically have a COR of about 0.76 or greater; and preferably about 0.80 or greater. The compression of the core preferably is about 50 to about 130, and more preferably in the range of about 70 to about 110.

Core Structure

As discussed above, the core is preferably a dual-core comprising an inner core (center) and surrounding outer core layer. In one preferred embodiment, the outer core is formed from a thermoplastic polyamide composition; and an inner core comprising an ionomer composition comprising an ethylene acid copolymer containing acid groups neutralized to greater than 70%. Preferably, the inner core has a center hardness (CH) within a range having a lower limit of 30 or 35 or 40 or 45 or 50 or 55 Shore D and an upper limit of 60 or 65 or 70 or 75 or 80 or 85 or 90 Shore D. The inner core (center) also preferably has a surface hardness (ICSH) within a range having a lower limit of 30 or 35 or 40 or 45 or 50 or 55 Shore D and an upper limit of 60 or 65 or 70 or 75 or 80 or 85 or 90 Shore D. Meanwhile, the outer core layer preferably has a surface hardness (OCLSH) within a range having a lower limit of 40 or 45 or 50 or 55 Shore D and an upper limit of 60 or 65 or 70 or 75 or 80 or 85 or 90 Shore D. Preferably, the surface hardness of the outer core layer (polyamide composition) is greater than the center hardness of the inner core (ionomer composition). In an alternative version, the polyamide composition is used to form the inner core, while the ionomer composition is used to form the outer core; and. the center hardness of the inner core is greater than the surface hardness of the outer core layer.

Particularly, in one preferred instance, the center hardness of the inner core is in the range of about 30 to about 82 Shore D units and the surface hardness of the outer core is in the range of about 40 to about 87 Shore D units. More particularly, the center hardness of the inner core is about 30 Shore D units or greater and the surface hardness of the outer core is about 40 Shore D units or greater. In these instances, the surface hardness (outer core) is preferably at least 5 Shore D units greater than the center hardness (inner core).

As discussed above, in another instances, the center hardness of the inner core is greater than the surface hardness of the outer core layer. For example, the center hardness may be about 40 Shore D units or greater and the surface hardness of the outer core may be about 30 Shore D units or greater. In these instances, the center hardness (inner core) is preferably at least 5 Shore D units greater than the surface hardness (outer core).

In one preferred golf ball, the inner core (center) has a "positive" hardness gradient (that is, the outer surface of the inner core is harder than its geometric center) and the outer core layer has a "positive" hardness gradient (that is, the outer surface of the outer core layer is harder than the inner surface of the outer core layer.) In cases where both the inner core and outer core layer have "positive" hardness gradients, the outer surface hardness of the outer core layer is still preferably greater than the material hardness of the inner core (center).

In another version, the inner core (center) has a positive hardness gradient, while the outer core layer has a "negative" hardness gradient (that is, the outer surface of the outer core layer is softer than the inner surface of the outer core layer.) In yet another version, the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center (or second surface) Shore C hardness gradient of less than 8, preferably less than 5 and most preferably less than 3 and may have a value of zero or negative 1 to negative 25. The term, "negative hardness gradient" as used herein, means a surface to center (or second surface) Shore C hardness gradient of less than zero. The terms, "zero hardness gradient" and "negative hardness gradient," may be used herein interchangeably to refer to hardness gradients of negative 1 to negative 25. The term, "positive hardness gradient" as used herein, means a surface to center (or second surface) Shore C hardness gradient of 8 or greater, preferably 10 or greater, and most preferably 20 or greater. By the term, "steep positive hardness gradient" as used herein, it is meant surface to center (or second surface) Shore C hardness gradient of 20 or greater, more preferably 25 or greater, and most preferably 30 or greater. For example, the core may have a steep positive hardness gradient of 35, 40, or 45 Shore C or greater.

Preferably, the hardness gradient from geometric center of the inner core to the surface of the outer core layer is a positive hardness gradient. That is, the outer surface of the outer core layer is harder than the center of the inner core. Methods for measuring the hardness of the core and cover layers and determining the hardness gradients are discussed in further detail below.

As discussed above, the dual-core constitutes an inner core (center) and an outer core layer. The inner core preferably has a diameter within a range having a lower limit of 0.125 or 0.130 or 0.140 or 0.150 or 0.20 or 0.40 or 0.80 inches and an upper limit of 1.125 or 1.20 or 1.40 or 1.50 or 1.55 inches. More preferably, the inner core has a diameter in the range of about 0.125 to about 1.50 inches. The outer core preferably has a thickness within a range having a lower limit of 0.010 or 0.020 or 0.025 or 0.030 or 0.035 or 0.040 inches and an upper limit of 0.570 or 0.070 or 0.080 or 0.090 or 0.100 or 0.125 or 0.150 inches. Particularly, the outer core layer may have a thickness in the range of about 0.010 to about 0.570 inches and more preferably in the range of about 0.020 to about 0.280 inches. In other embodiments, particularly when the polyamide composition is used to form the inner core, the inner core may be even smaller. For example, the inner core may have a diameter in the range of about 0.050 to about 1.40 inches, more preferably about 0.100 to about 0.700 inches. In such cases, the outer core layer may have a thickness in the range of about 0.020 to about 0.650 inches. The outer core layer encloses the inner core such that the two-layered core has an overall diameter within a range having a lower limit of 1.20 or 1.30 or 1.40 or 1.50 or 1.51 or 1.52 or 1.525 inches and an upper limit of 1.54 or 1.55 or 1.555 or 1.56 or 1.59 or 1.62 or 1.64 inches.

The inner core (center) preferably has a compression within a range having a lower limit of 10 or less, 20 or less, 30 or less, 40 or less, 50 or less; and an upper limit of 55 or greater, 65 or greater, 75 or greater, 80 or greater, 90 or greater, 100 or greater, 110 or greater, 120 or greater, 130 or greater, or 150 or greater.

Cover Structure

The golf ball cores of this invention may be enclosed with one or more cover layers. A wide variety of materials may be used for forming the outer cover including, for example, polyurethanes; polyureas; copolymers, blends and hybrids of polyurethane and polyurea; ethylene acid copolymer ionomer resins (for example, Surlyn® ionomer resins and HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to help make a golf ball having high resiliency and a soft feel. By the term, "hybrids of polyurethane and polyurea," it is meant to include copolymers and blends of polyurethanes and polyureas.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one preferred embodiment, the ball includes a dual-cover comprising inner and outer cover layers. The inner cover layer is preferably formed from a composition comprising an ionomer or a blend of two or more ionomers that helps impart hardness to the ball. The inner cover layer preferably has a material hardness of 95 Shore C or less, or less than 95 Shore C, or 92 Shore C or less, or 90 Shore C or less, or a material hardness within a range having a lower limit of 60 or 65 or 70 or 75 or 80 or 84 or 85 Shore C and an upper limit of 90 or 92 or 95 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches.

In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont), which is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is a 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In one embodiment, the inner cover layer is formed from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is formed from a composition comprising a 50/25/25 blend of Surlyn® 8940/Surlyn® 9650/Surlyn® 9910, preferably having a material hardness of about 90 Shore C. In another version, a blend of 50% Surlyn® 7940 and 50% Surlyn® 8940 is used to form the inner cover. In yet another particular embodiment, the inner cover layer is preferably formed from a composition comprising a 50/50 blend of Surlyn® 8940/Surlyn® 9650, preferably having a material hardness of about 86 Shore C. Surlyn® 8940 is an ethylene/methacrylic acid copolymer in which the MAA acid groups have been partially neutralized with sodium ions. Surlyn® 9650 and Surlyn® 9910 are two different grades of ethylene/methacrylic acid copolymer in which the MAA acid groups have been partially neutralized with zinc ions. Surlyn® 7940 is a copolymer of about 85% ethylene and 15% methacrylic acid that has been neutralized with lithium ions. Nucrel® 960 is an ethylene/methacrylic acid copolymer resin nominally made with 15 wt % methacrylic acid, and available from DuPont.

As discussed above, the dual-core of the golf ball may be enclosed with a single-layered or multi-layered covers. In one embodiment, a single-layered cover having a thickness in the range of about 0.015 to about 0.090 inches, more preferably about 0.030 to about 0.070 inches, is formed. The cover has a hardness of about Shore D 80 or less, more preferably 70 or less, and most preferably about 60 or less. In another embodiment, a multi-layered cover comprising inner and outer cover layers is formed, where the inner cover layer preferably has a thickness of about 0.011 inches to about 0.110 inches, more preferably about 0.02 inches to about 0.08 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.010 inches to about 0.100 inches, more preferably about 0.02 inches to about 0.06 inches, and most preferably about 0.025 inches to about 0.045 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer.

Golf Ball Constructions

As discussed above, the thermoplastic polyamide and ionomer compositions of this invention may be used to form a core for any suitable ball construction, including, for example, three-piece, four-piece, and five-piece designs.

The core and cover compositions may be prepared using conventional mixing techniques. The core composition can be formed into an inner core structure by ordinary techniques such as, for example, injection or compression molding. After molding, the core structure is removed from the mold and its surface may be treated using techniques such as corona discharge, sand blasting, or grinding to improve adhesion of any surrounding layers. Injection molding or compression molding can be used to form an outer core layer and intermediate or inner cover layer (if desirable) about the inner core. In this manner, an intermediate golf ball is produced. The cover layer(s) is subsequently molded over the intermediate ball to produce a final golf ball.

In compression molding, the outer core and/or inner cover composition is formed into smooth surfaced hemispherical shells which are then positioned around the inner core in a mold having the desired inner cover thickness and subjected to compression molding under heat followed by cooling. This process fuses the shells together to form a unitary intermediate ball. Alternatively, the intermediate balls may be produced by injection molding, wherein the outer core and/or inner cover layer is injected directly around the core placed at the center of an intermediate ball mold under heat and pressure. After molding, the golf balls produced may undergo various further processing steps such as buffing, painting and marking using conventional techniques to produce a finished ball.

Figure 1:
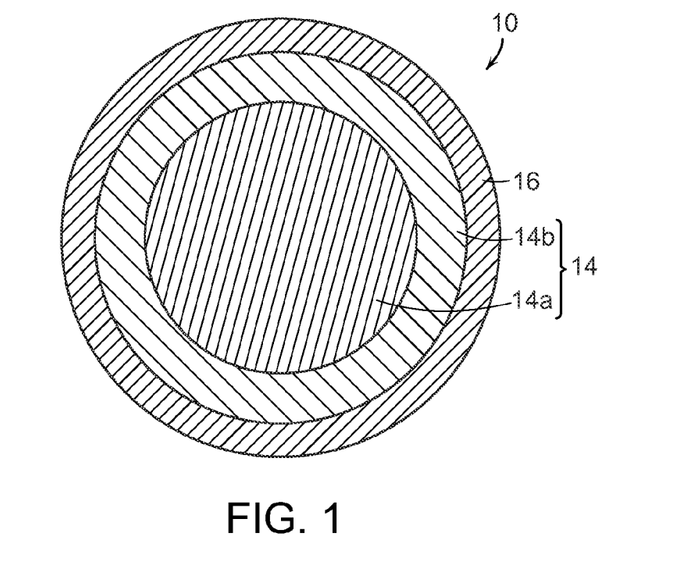
FIG. 1 is a cross-sectional view of a three-piece golf ball having a dual-core comprising an inner core/outer core, and a cover layer made in accordance with this invention.
Figure 2:
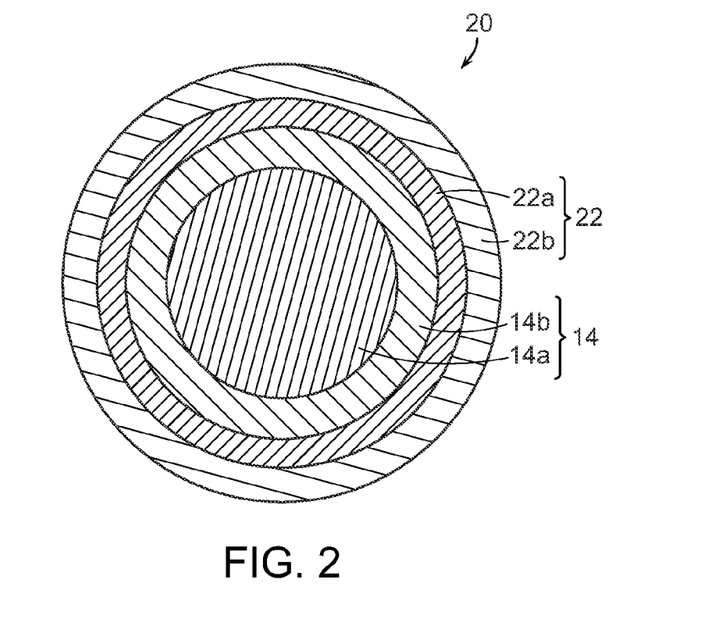
FIG. 2 is a cross-sectional view of a four-piece golf ball having a dual-core comprising an inner core/outer core; an inner cover layer; and an outer cover layer made in accordance with the present invention.

Referring to FIG. 1, one version of a golf ball that can be made in accordance with this invention is generally indicated at (10). The ball (10) contains a dual-core (14) having an inner core (center) (14a) and outer core layer (14b) surrounded by a single-layered cover (16). The center (14a) is formed preferably from a highly neutralized ionomer composition as discussed above. The outer core layer (14b) is formed from a polyamide composition as discussed above. In FIG. 2, a golf ball (20) containing the above-described dual-core (14) is surrounded by a dual-cover (22) having an inner cover layer (22a) and outer cover layer (22b), which may be formed from any of the cover materials described above.

The surfaces of the golf balls shown in FIGS. 1-2 may have various dimple patterns to modify the aerodynamic properties of the ball. It should be understood the golf balls shown in FIGS. 1-2 are for illustrative purposes only and not meant to be restrictive. Other golf ball constructions can be made in accordance with this invention.

For example, a golf ball containing an inner core (center); an intermediate core layer; and an outer core layer may be made. The center preferably has a diameter within a range having a lower limit of 0.100 or 0.125 or 0.250 inches and an upper limit of 0.375 or 0.500 or 0.750 or 1.00 inches. The intermediate core layer preferably has a thickness within a range having a lower limit of 0.050 or 0.100 or 0.150 or 0.200 inches and an upper limit of 0.300 or 0.350 or 0.400 or 0.500 inches. The outer core layer encloses the center and intermediate core layer structure such that the multi-layer core has an overall diameter within a range having a lower limit of 1.40 or 1.45 or 1.50 or 1.55 inches and an upper limit of 1.58 or 1.60 or 1.62 or 1.66 inches.

In one embodiment, the center is made of a rubber material such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, and polystyrene elastomers. Meanwhile; the intermediate core layer is made of a polyamide composition. Finally, the outer core layer is made of an ethylene acid copolymer ionomer composition containing acid groups neutralized to greater than 70%.

In one particular embodiment, the center has an outer surface hardness of 70 Shore C or greater, more preferably a surface hardness of 80 Shore C or greater, and most preferably a surface hardness of 85 Shore C or greater. For example, the center may have an outer surface hardness within a range having a lower limit of 70 or 75 or 80 Shore C and an upper limit of 90 or 95 Shore C. The outer core layer may have an outer surface hardness that is less than that of the center and is preferably 50 Shore C or less; or 60 Shore C or less; or 70 Shore C or less; or 75 Shore C or less; or 80 Shore C or less. The intermediate layer preferably has an outer surface hardness greater than that of the center and outer core layer. Preferably, the intermediate layer has a surface hardness of 80 Shore C or greater.

In another embodiment, the center is made of a rubber material as described above; the intermediate core layer is made of the ionomer composition containing acid groups neutralized to greater than 70%; and the outer core layer is made of the polyamide composition as described above.

It is recognized that additional golf ball constructions can be made without departing from the spirit and scope of the present invention. For example, in one version, the inner core is made of a polyamide composition. The intermediate core layer is made of an ethylene acid copolymer ionomer composition containing acid groups neutralized to greater than 70%; and the outer core layer is made of a rubber material as described above. In yet another version, the inner core is made of the above-mentioned ethylene acid copolymer ionomer composition; the intermediate core layer is made of the foregoing polyamide composition; and the outer core layer is made of a rubber material as described above.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR").

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising:
   a) an inner core formed from an ionomer composition comprising an ethylene acid copolymer and containing acid groups such that greater than 70% of the acid groups are neutralized; the ionomer composition having a flex modulus of 80,000 psi or less;
   b) an outer core layer formed from a polyamide composition having a flex modulus of 90,000 psi or greater, the polyamide having a first flex modulus value at 0% relative humidity and 23° C., and a second flex modulus value at 50% relative humidity and 23° C., the difference between the first and second flex modulus values being no greater than 20%, wherein the center of the inner core has a hardness in the range of 30 to 60 Shore D and the surface of the inner core has a surface hardness in the range of 35 to 65 Shore D, and the outer core layer has a surface hardness in the range of 60 to 90 Shore D, the inner core and outer core layer each having a positive hardness gradient, and wherein the surface hardness of the outer core layer is greater than the center hardness of the inner core; and c) a cover having at least one layer.

2. The golf ball of claim 1, wherein the modulus of the ionomer composition is at least 15% less than the modulus of the polyamide composition.

3. The golf bail of claim 1 wherein the modulus of the ionomer composition is 70,000 psi or less and the modulus of the polyamide composition is 90,000 psi or greater.

4. The golf ball of claim 1, wherein the modulus of the ionomer composition is 50,000 psi or less and the modulus of the polyamide composition is 90,000 psi or greater.

5. The golf ball of claim 1, wherein the modulus of the ionomer composition is 80,000 psi or less and the modulus of the polyamide composition is 100,000 psi or greater.

6. The golf ball of claim 1, wherein the modulus of the ionorner composition is 80,000 psi or less and the modulus of the polyamide composition is 120,000 psi or greater., 7. The golf ball of claim 1, wherein the cover is a single layer having a thickness of about 0.015 to about 0.090 inches and is formed from a thermoplastic or thermoset material.

8. The golf ball of claim 1, wherein the inner core has a diameter in the range of about 0.125 to about 1.50 inches.

9. The golf ball of claim 1, wherein the outer core layer has a thickness in the range of about 0.010 to about 0.570 inches.

10. The golf ball of claim 1, wherein the outer core layer has a thickness in the range of about 0.020 to about 0.280 inches.

11. The golf ball of claim 1, wherein the dual-core core has an overall compression in the range of about 50 to about 130.

12. The golf all of claim 11, wherein the dual-core has an overall compression in the range of about 70 to about 110.

* * * * *